UNITED STATES PATENT OFFICE.

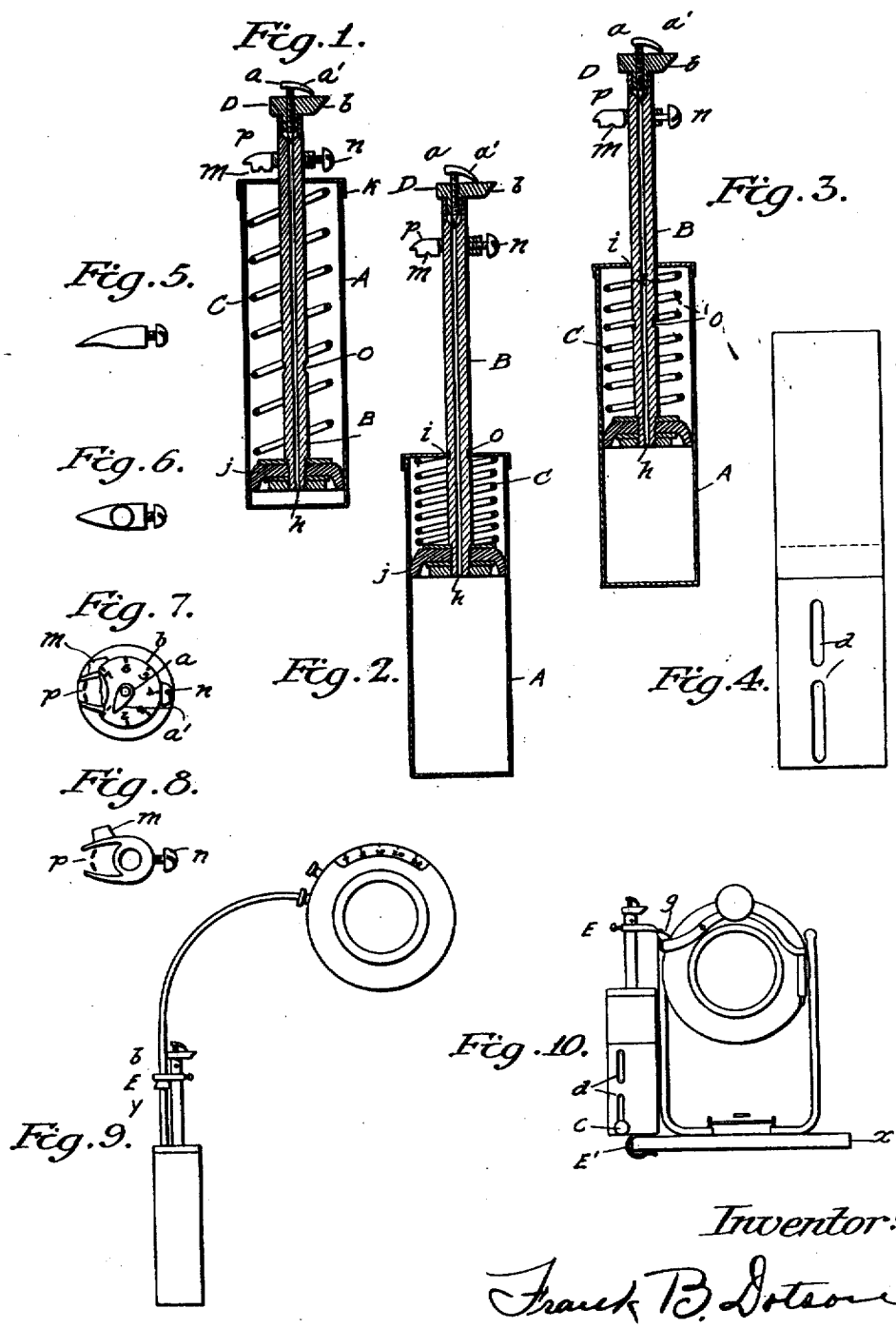

FRANK B. DOTSON, OF BURLEY, IDAHO.

AUTOMATIC CAMERA-OPERATOR.

1,323,230.  Specification of Letters Patent.  Patented Nov. 25, 1919.

Application filed February 10, 1916. Serial No. 77,475.

*To all whom it may concern:*

Be it known that I, FRANK B. DOTSON, a citizen of the United States, residing at Burley, in the county of Cassia and State of Idaho, have invented a new and useful Camera Device—to wit, an Automatic Camera-Operator—of which the following is a specification.

The object of this invention is to automatically operate cameras and kodaks, by pressing or in some other manner working the lever or other device used to trip the shutter in making the exposure. This device, when properly attached to or built into the camera, will operate the camera without the physical aid of any person, at the instant of exposure. Thus the necessity of a person being at or near the camera at the instant the picture is taken is eliminated. The particular object, then, of this invention is to enable a person to operate his camera or kodak when at a distance from the same, thus enabling the person in charge of the camera or kodak to take his own picture.

I attain the object of this invention by the means of the device and mechanism illustrated in the accompanying drawing, in which:

Figure 1 is a vertical section of the entire automatic operator, equipped with an expansion coil spring, showing the piston practically at the bottom of the air chamber; Fig. 2, a vertical section same as Fig. 1, except that the piston is raised to its extreme height, and held by means of notch *o* in the piston rod, hooked on the edge of the piston rod opening *i*, in the lid *k;* Fig. 3, a vertical section showing the position of the piston after the piston rod has been released from its rest at *i*, and showing the piston re-resting upon the compressed air in the chamber beneath; Fig. 4 is a carrying case so devised and constructed as to facilitate the attachment of the operator to the camera, and thus used is a part of the camera-operator and a portion of this invention; Figs. 5 and 6 are each, respectively, a side view and a top view of hook used for contact with trigger of the camera shutter, designated below as E; Fig. 7 is a top view of the camera-operator equipped with a combined attachment suitable for either direct contact with the shutter trigger or attachment to a wire cable release; Fig. 8 is a top view of the combined attachment device with *p*, suitable for attachment to a wire cable release, and *m*, a hook for direct contact with the shutter trigger; Fig. 9 shows the automatic operator attached to wire cable release so as to operate the camera; Fig. 10 shows the automatic operator attached to the camera so as to operate the camera by means of direct contact with the shutter trigger.

Similar letters refer to similar parts throughout the several views.

This invention is made up of seven particular parts or combination of parts, designated in the accompanying drawings as A, B, C, D, E and E', in Fig. 4.

Part A is a cylindrical tube, composed of metal or other hard material, with the contour smooth, closed airtight at its bottom and with a removable cap at the top; B is an air plunger and includes the piston rod, piston and all parts of the plunger head; C is an expanding coil spring which produces the required operating power; D is a needle air valve; E is hook or device which makes contact with the shutter lever or trigger, or attaches to the wire cable release, and thus transmits the motive power of the operator to the mechanism which operates the shutter; E' is a hook or device which fastens the body of the operator to some stationary part of the camera; Fig. 4 is the case or covering for the operator, the bottom part of which is slidably mounted about the lower half of tube A, thus providing a movable rest for E'.

The tube A is similar in form and material to that of a small hand air pump. It is airtight at one end and has a removable cap at the other end. The said cap has a cutout or opening in its center through which the piston rod operates. The inside surface of tube A must be perfectly smooth.

The plunger, B, is slidably mounted in tube A so that the piston rod operates through the opening *i* in cap *k*. The said plunger, including piston rod, piston, leather washer and other parts of the plunger, are similar to the plunger and its parts in a small hand air-pump. The piston rod should be hollow and should be of sufficient length to project one-half inch, more or less, above cap *k* when the plunger head rests on the bottom of tube A, and should have the notch or shoulder *o* to hook or rest on the edge of opening *i* when the plunger is raised to its extreme height. The leather washer mentioned is similar to that of the said air pump and is so shaped and inserted that air cannot escape around its edges from beneath when the piston rod is released from its rest at $i$.

The needle valve, D, is for the escape of air beneath the plunger. It is inserted in the hollow of the piston rod, which hollow at all times connects with the air chamber beneath the plunger. However, if desired, the valve may be inserted at the bottom of tube A, thus permitting the use of a solid piston rod instead of the hollow one. About the valve is a dial and pointer constituting an indicator to aid in the accurate operation of the valve, as is shown in Fig. 7.

The purpose of the expanding spring, C, is to produce the required operating power. This spring is inserted about the piston rod so that one end engages the piston and the other end engages the inside surface of cap $k$.

Part E is the device used to make contact with the lever or trigger of the camera shutter, or to attach the operator to the wire cable release. It is the device used to attach or transmit the motive force of the automatic operator to the mechanism of the camera which operates the shutter. This device may be either of three different forms as follows: a one prong hook as used in Fig. 10, a two prong device as used in Fig. 9, or a device having the one prong hook and the two prong device combined as shown in Figs. 7 and 8. The one prong hook is used when only direct contact with the shutter trigger is desired. The two prong device is used when attachment to the wire cable release only is desired. The combined device with hook and two prongs is used when one desires to make either direct contact, as shown in Fig. 10, or attachment to the wire cable release, as shown in Fig. 9. In either instance the device is adjusted about the piston rod $e$, above cap $k$, by means of a set-screw $n$ so that its position may be readily changed by sliding it up or down said rod.

E' is a resilient hook or clamp used to attach the body or cylinder of the operator to the camera. This clamp is situated at the bottom or slidably mounted portion of the case or cover represented by Fig. 4 as is shown in Fig. 10.

Fig. 4 is the portion of this invention used as a case or covering for the operator, and for the further purpose of aiding in the attachment of the operator to the camera. This case or cover is metallic, cylindrical in shape, and of size to neatly fit about the body of the operator. It is made up of two pieces or parts of about equal length which fit together in telescopic fashion, thus forming the inclosure. The bottom portion of this case is mounted in telescopic fashion about the bottom portion of the operator and is held in position by means of a set-screw $c$ which is inserted through slots $d$ in the side of said bottom portion of the case, as illustrated in Fig. 10. The said set-screw enters a small tap at the bottom of the operator, and by slightly loosening and tightening the same the bottom portion of the said case may be moved a distance equal to the length of the slot, thus providing a means of extending and adjusting the reach of clamp E'. This adjustment is made necessary because the distance from the lever $g$ to the point where E' is desired to be attached differs on the various kinds of cameras. Both ends of the case are closed.

This invention may be operated in the following manner:

Close the valve D; lift the plunger until notch $o$ is even with the top of cap $k$; temporarily hold plunger in this raised position by resting shoulder on the plunger rod formed by notch $o$, on the cap $k$ at $i$; release the plunger rod from the temporary rest at $i$; attach the operator to the camera, by direct contact as shown in Fig. 10 or, by use of the wire cable release as shown in Fig. 9. When all of said steps have been taken the objects of view should be determined and the camera focus and other details arranged, and when this is done the screw $a$ should be turned until the pointer $a'$ reaches a position on the dial $b$, which position has been determined by prior experience, so that the air valve will be opened only enough to permit the desired period of time to elapse until the exposure is made. When the valve has been adjusted so as to set the plunger in motion the person in charge of the camera is at liberty to take a position so that he shall be in the picture thus made. After the exposure is made the operator should be removed before arrangement is made for another exposure.

When the plunger is raised the air passes between the edges of the leather washer $j$ and the interior walls of tube A to the chamber beneath the plunger head. The opening $i$ in cap $k$ permits air to pass into and out of the chamber above the piston. When the plunger rod is released from its rest at $i$ the leather washer prevents the escape of the air beneath when the coil spring C forces the plunger downward, thus forming an air cushion upon which the plunger-head rests. When the air is permitted to escape through the valve D the plunger is forced gently to the bottom of the chamber, causing no jar whatever. In making direct contact as illustrated in Fig. 10 it is usually necessary to file a small notch in the lever $g$ at the point where E engages $g$. By means of clamp E' the body or cylinder of the operator is held in a stationary position so as to permit the slidably mounted plunger rod to draw the lever $g$ downward. The operator is attached to the wire cable release, as illustrated in Fig. 9, by forcing the enlarged part of the cable release, through which the pushpin works, between the two resilient prongs of E in such a manner that the head of the pushpin of the cable release engages the top surface of cap $k$. The said resilient prongs of E are the same as those marked or designated $p$ in Figs. 7 and 8. E is slidably adjusted in the desired position by means of the set-screw $n$. Thus attached it can be readily seen that when the plunger rod draws the member E downward the cable release is operated with the same result as if operated by hand.

From the foregoing description and explanation, in connection with the accompanying drawing, the person skilled in the art or science of operating cameras can easily see the advantages of this invention. Merely the principles of operation and the general features of construction are described and explained herein. It must be understood that the details of construction and arrangement of the various parts may be altered as practical conditions demand so long as kept within the scope of my claims.

I claim:—

1. In a device of the character described for automatically operating cameras, the combination of a tube or cylinder having closed ends, a piston slidably mounted in said cylinder, a plunger-rod extending from said piston through the top end or head of said cylinder, a notch or cross groove in said plunger-rod forming a hook or shoulder adapted to engage or rest upon the head of said cylinder and releasably hold said piston in a raised position, and a coil spring as a means for returning the piston to its normal position, a device slidably adjusted about the neck of said plunger-rod as a means of contact with or of attachment to the operating member of the camera shutter, a needle air valve connecting with the bottom of the chamber in said cylinder as a means of releasing the air from said chamber beneath said piston, a cylindrical metallic receptacle closed at one end telescopically seated about said cylinder so as to envelop the bottom portion thereof and so as to be fixedly extended from or contracted toward the bottom of said cylinder, a metallic cap or lid removably seated about the top of said receptacle so as to inclose all members which project above said cylinder head, substantially as illustrated and set out in the specification and accompanying drawing.

2. In a device of the character described for automatically operating cameras, the combination of a tube or cylinder having closed ends, a piston slidably mounted in said cylinder, a plunger-rod extending from said piston through the top end or head of said cylinder, a notch or cross groove in said plunger-rod forming a hook or shoulder adapted to engage or rest upon the head of said cylinder and releasably hold said piston in a raised position, a coil spring as means for returning the piston to its normal position, a device slidably adjusted about the neck of said plunger-rod as a means of contact with or of attachment to the operating member of the camera shutter, a needle air valve connected with the bottom of the chamber in said cylinder as a means of releasing the air from said chamber beneath said piston, a cylindrical metallic receptacle closed at one end telescopically seated about said cylinder so as to envelop the bottom portion thereof and so as to be fixedly extended from or contracted toward the bottom of said cylinder, a metallic cap or lid removably seated about the top of said receptacle so as to inclose all members which project above said cylinder head, and a clamp or hook attached to said metallic receptacle adapted to connect with and fasten to the body or frame of the camera, substantially as described in the specification.

In witness whereof I affix my signature in the presence of two witnesses.

FRANK B. DOTSON.

Witnesses:
  HENRY D. KELLY,
  LORENZO B. THOMPSON.